US006377601B1

(12) United States Patent
Aoki

(10) Patent No.: US 6,377,601 B1
(45) Date of Patent: Apr. 23, 2002

(54) ION LASER APPARATUS AND MIRROR ANGLE ADJUSTING METHOD THEREFOR

(75) Inventor: Yasushi Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/497,273

(22) Filed: Feb. 3, 2000

(30) Foreign Application Priority Data

Feb. 4, 1999 (JP) .......................................... 11-026836

(51) Int. Cl.[7] .................................................. H01S 3/08
(52) U.S. Cl. ............................ 372/107; 372/24; 372/29
(58) Field of Search ............................. 372/107, 29, 24

(56) References Cited

U.S. PATENT DOCUMENTS 4,772,121 A * 9/1988 Trageser ..................... 372/107
5,200,965 A * 4/1993 Okuyama et al. ........... 372/107
5,339,324 A * 8/1994 Eguchi et al. ................ 372/29
5,357,539 A * 10/1994 Otani et al. ................. 372/107
5,367,531 A * 11/1994 Euguchi et al. ............. 372/107

FOREIGN PATENT DOCUMENTS

| JP | 5-021885 | 1/1993 |
| JP | 5-037050 | 2/1993 |
| JP | 9-153654 | 6/1997 |

* cited by examiner

Primary Examiner—Leon Scott, Jr.

(57) ABSTRACT

An ion laser apparatus includes a laser tube, first and second mirrors, a mirror angle adjusting mechanism, and an alignment controller. The first and second mirrors are disposed to sandwich the laser tube. The mirror angle adjusting mechanism adjusts an angle of at least one of the mirrors while scanning the mirror within a predetermined angle width. The alignment controller determines a scan angle width of the mirror in accordance with a light intensity distribution of a laser beam such that a variation value of the laser beam output from the laser tube falls within a predetermined width. A mirror angle adjusting method for this ion laser apparatus is also disclosed.

15 Claims, 12 Drawing Sheets

ION LASER APPARATUS AND MIRROR ANGLE ADJUSTING METHOD THEREFOR

BACKGROUND OF THE INVENTION

The present invention relates to an ion laser apparatus and a mirror adjusting method therefor.

FIG. 5 shows the overall arrangement of a conventional ion laser apparatus. As shown in FIG. 5, an ion laser apparatus 101 is comprised of a laser oscillator 102, alignment controller 103, and power supply 127. The laser oscillator 102 is comprised of a laser tube 104, a support 105 for supporting the laser tube 104, an output mirror 106, a total-reflecting mirror 107, and a mirror angle adjusting mechanism 108 for adjusting the mirror angle. The alignment controller 103 is comprised of an optical detector 118 for measuring the intensity of a monitor beam 117, an A/D converter 121, an arithmetic controller 122 for controlling stepping motors 120, and motor drivers 123 for driving the stepping motors 120.

The operation of the ion laser apparatus having the above arrangement will be briefly described. A laser beam 115 emitted by the laser tube 104 is reflected by the total-reflecting mirror 107 and transmitted through the output mirror 106. Part of the transmitted laser beam 115 is guided by a beam splitter 116 to the optical detector 118 as the monitor beam 117, while the remaining transmitted laser beam 115 emerges to the outside as the laser beam 115. The optical detector 118 detects the optical intensity of the monitor beam 117. A signal obtained by the optical detector 118 is A/D-converted by the A/D converter 121, is processed by the arithmetic controller 122, and drives the stepping motors 120 through the motor drivers 123 in order to correct the tilt of the total-reflecting mirror 107 or output mirror 106.

The detailed structure and operation of the mirror angle adjusting mechanism 108 will be described.

FIG. 6 shows the mirror angle adjusting mechanism 108 in enlargement.

FIG. 7 shows a stationary plate seen from a side where the stepping motors 120 are disposed. The support 105 where the laser tube 104 is fixed is constituted by an invar rod 109 which is a metal having a low coefficient of thermal expansion, to suppress thermal expansion in the direction of optical path of the laser beam 115. Stationary plates 110 and movable plates 111 are arranged on two ends of the support 105 with tension springs 112 and adjustment screws 114a to 114c, to be parallel to each other. The output mirror 106 and total-reflecting mirror 107 are fixed to the movable plates 111, respectively, through mirror holders 113.

The gap between each stationary plate and the corresponding movable plate is determined by the projecting lengths of the adjustment screws 114a to 114c from the movable plate. The lengths of the projecting portions of the three adjustment screws 114a to 114c and the positions of the three adjustment screws 114a to 114c which are determined by design determine the tilt of the mirror. When the adjustment screw 114b is rotated about, of the adjustment screws 114a to 114c arranged to form a shape L, the adjustment screw 114a located at the pivotal point as the fulcrum, the tilt of the mirror can be changed in the vertical direction. Similarly, when the adjustment screw 114c is rotated, the tilt of the mirror can be changed in the horizontal direction. The tilt of the mirror is adjusted to an arbitrary value by the two adjustment screws 114b and 114c while measuring a laser output, thereby adjusting the laser output to the maximum value. The adjustment screws 114 are driven in the following manner. The arithmetic controller 122 performs arithmetic operation based on an output signal of the monitor beam 117. The obtained operation signal indicating the rotational direction and angle of each motor shaft is sent from the arithmetic controller 122 to the stepping motors 120b and 120c through the motor drivers 123 as the number of pulses necessary for the stepping motors 120b and 120c. As a result, the stepping motors 120b and 120c are rotated, thereby driving the adjustment screws 114.

The procedure of adjusting the mirror angle of the ion laser apparatus having the above arrangement will be described.

FIG. 8 shows a conventional mirror angle adjusting procedure. In the following description, for the sake of descriptive convenience, left and right sides are those obtained when viewed from the reflection side to the exit direction. The stepping motors 120b and 120c, and the adjustment screws 114b and 114c may form reduction gear structures by means of gears. For easy description, a case wherein the reduction ratio is 1:1 will be described. Regarding the tilt angle of the mirror with respect to the rotational angle of the adjustment screw, for the sake of easy description, note that a rotational angle of 1° of the adjustment screw corresponds to a change of 0.01° of the tilt angle of the mirror.

In step S200, the ion laser apparatus 101 is started by a constant-current operation obtained by controlling a discharge current to a constant value, thereby performing laser oscillation. In step S210, of the laser beam, a monitor beam reflected by the beam splitter 116 is detected. In step S220, the detected data is A/D-converted.

The flow enters the coarse adjustment operation mode (S230), which is the first step of automatic mirror adjustment. First, in step S231, coarse adjustment in the vertical direction is performed. In step S231, the vertical-direction adjustment screw 114b is rotated, and its output change data is acquired. For example, the vertical-direction stepping motor 120b is rotated counterclockwise through a ½ turn to rotate the adjustment screw 114b counterclockwise through a ½ turn. From this position, the stepping motor 120b is rotated clockwise through a ½ turn, while measuring the output data of the laser beam in units of specified angles (the angle is specified by variably changing the pulse count). In this conventional example, an angle of 3° is defined as one step (unit). When 60 data corresponding to a ½ turn are measured, the stepping motor 120b returns to the initial position. After that, the stepping motor 120b is further rotated clockwise through a ½ turn while measuring the output data. Hence, measurement of data on the ½ turn from the initial position in each of the clockwise and counterclockwise directions or a total of 1 turn, i.e., 120 output data, is completed. This corresponds to 3.6° in mirror angle. FIG. 9 shows a measurement example of the output data.

FIG. 9 shows the characteristics of alignment sensitivity indicating the scan angle width and an output variation width. Generally, the change characteristics of the laser output with respect to a change in mirror angle are called alignment sensitivity characteristics. In FIG. 9, the initial position at the start of a laser is defined as the reference position, and the center of the axis of abscissa is defined as 0. If the width of these characteristics is large, the laser oscillator is not sensitive to a change in mirror angle; inversely, if it is small and forms a sharp shape, the laser oscillator is sensitive to a change in mirror angle. In the case of FIG. 9, the maximum value is located at 90° of the counterclockwise rotation of the motor shaft. This is due to the following reason. Since this state is immediately after the laser is started, the temperature in the oscillator has not reached a stable state, so that the maximum value is offset from the optimum angle of the mirror.

The adjustment screws are adjusted on the basis of the measured data. More specifically, the stepping motor 120b is so rotated as to return to the maximum angle of the measured data, and is stopped. In this example, the stepping motor 120b is rotated counterclockwise through 90°, and then stopped. Coarse adjustment in the vertical direction is thus completed. In this state, a position reached after rotation through 90° from the initial position serves as the reference position in the next step. Therefore, data is shifted such that the position of 90° in FIG. 9 comes to 0° at the center (see FIG. 10). Subsequently, in step S232, coarse adjustment in the horizontal direction is performed in the same manner as in step S231. More specifically, the horizontal-direction stepping motor 120c is rotated, and data is measured. The stepping motor 120c is rotated, on the basis of the measurement data, through an optimum mirror angle with which the maximum output can be obtained. Coarse adjustment in the horizontal direction is thus performed.

The coarse adjustment mode is thus completed. Consecutively, the fine adjustment operation mode in step S240 is performed in order to maintain the optimum mirror angle so as to cope with a temperature rise in the oscillator or a change in the ambient temperature that occurs after the coarse adjustment mode. In both the vertical and horizontal directions, a position in FIG. 10 where the maximum output can be obtained is assumed as the reference 0.

In the same manner as the coarse adjustment mode, the fine adjustment mode is performed by rotating the motor clockwise and counterclockwise from this position to a position where the maximum output within the rotation width can be obtained. If the rotational angle is large, the output varies largely. Thus, the rotational angle in the fine adjustment mode is smaller than that in the coarse adjustment mode. The fine adjustment mode is different from the coarse adjustment mode in this respect.

In the coarse adjustment mode, as shown by the alignment sensitivity characteristics of FIG. 9, the motor is rotated clockwise and counterclockwise through an angle equal to or more than the width of the laser oscillation angle (with a rotational angle of about 230° and a mirror angle of 2.3°). In this example, the motor is rotated clockwise and counterclockwise with a rotational angle of 360° and a mirror angle of 3.6°. In the fine adjustment mode, the motor is rotated in a trial-and-error manner in the vicinity of the peak of the alignment sensitivity characteristics to find the maximum point.

Conventionally, a scan angle width $\theta$ is set in advance, and the stepping motor is rotated within this range.

To perform fine adjustment in the vertical direction (S241), the vertical-direction stepping motor 120b and adjustment screw 114b are rotated counterclockwise through $\theta$, and are rotated clockwise through $\theta$ while measuring the output data of the laser beam in units of specified angles (specified by variably changing the pulse count). In this example, $\theta$ data corresponding to $\theta°$ are measured with reference to 1° as one step (unit), and the motor 120b is consecutively rotated clockwise through $\theta°$ while measuring the output data. Hence, measurement of 2$\theta$ pieces of output data corresponding to $\theta°$ in each of the clockwise and counterclockwise directions, i.e., a total of 2$\theta°$, is completed.

Subsequently, the motor is rotated from the initial position through an angle corresponding to the maximum value of the measurement data of $\theta°$ in both the clockwise and counterclockwise directions, and is stopped, to adjust the adjustment screw. Thus, one cycle of vertical-direction fine adjustment is ended. When the adjustment screw is moved in this manner, the laser output varies accordingly. The magnitude of variations changes within an output variation width $\delta_1$, as indicated by the output characteristics with respect to the mirror angle shown in FIG. 11. Then, horizontal-direction fine adjustment in step S242 is performed by moving the horizontal-direction stepping motor 120c in the same manner as in step S241. The horizontal-direction motor 120c is rotated through an angle corresponding to the maximum value of the measurement data, to adjust the corresponding adjustment screw. Thus, one cycle of horizontal-direction fine adjustment is ended.

If the respective elements of the laser oscillator 102 do not vary, further adjustment is not needed. In practice, however, since an alignment error occurs accompanying a temperature change, the fine adjustment operation in step S240 must be repeated until the laser apparatus 101 is stopped. With the above operation, an error in mirror angle caused by the temperature change is constantly corrected in order to set an optimum alignment state necessary for obtaining the maximum output at that point. The maximum output value accompanies an output variation width $\delta_1$.

The automatic mirror adjusting mechanism in the conventional ion laser apparatus has the following problems. The ion laser apparatus 101 is a laser unit that excites ions by performing discharge of several 10 amperes (to be described as A hereinafter) in a small hole called a thin pipe 124, in the laser tube 104, which has an inner diameter of several millimeters (to be described as mm hereinafter) and a length of several 100 mm, thereby producing laser oscillation. A discharge plasma of several 10 A sputters the inner surface of the thin pipe 124 to denature its material, accordingly changing the shape of the inner surface. As a material that can endure sputtering, beryllium oxide having excellent sputtering resistance is generally employed. Under the discharge current condition of as large as 50 A, however, the thin pipe 124 made of beryllium oxide is naturally denatured and deforms by sputtering. Also, a Brewster window 125 of the laser tube 104 is degraded by the ultraviolet rays emitted by the plasma discharge, and its transmission characteristics are accordingly decreased.

It is known that degradation of the component material over time as described above changes the alignment sensitivity to have a sharp peak. When the alignment sensitivity becomes sharp due to this change in the laser tube 104, the conventional automatic mirror adjusting mechanism performs mirror angle adjustment while maintaining the constant scan angle width of $\theta°$ which is set initially. Since the scan angle width of $\theta°$ is excessively large, the output variation width increases from $\delta_1$ to $\delta_2$, as shown in FIG. 12.

Various types of automatic mirror adjusting mechanisms have been proposed to solve these problems. For example, according to Japanese Patent Laid-Open No. 5-37050, to accurately obtain the output value and to perform correct determination, the number of times of the sampling operation is increased. A plurality of data corresponding in number to the sampling operation times are averaged to determine the magnitude of the output value. In this invention, however, the number of times of the sampling operation is increased to merely improve the reliability of the data, and the alignment sensitivity itself stays sharp. Therefore, the problem of sharp alignment sensitivity described above cannot be solved.

Japanese Patent Laid-Open No. 9-153654 discloses an invention that enables adjustment with a very small angle by using an electrostrictive element. According to this technique, the very small displacement amount of the angle of the laser mirror is adjusted by adjusting the pulse width of the voltage pulse in advance. A very small displacement amount of the angle of the mirror is synonymous with the preset scan angle width θ. The adjustment range does not change in accordance with the alignment sensitivity that changes over time. Therefore, the problem described above cannot be solved.

According to the technique disclosed in Japanese Patent Laid-Open No. 5-21885, in the operation of light feedback mode or light mode generally referred to in the ion laser apparatus, a discharge current is used when performing detection and control. Referring to the graph of the operation characteristics shown in this reference, when the transverse mode is a single mode, the flat portion of the peak forms a sharp hill, while the discharge current forms a deep bottom. As a result, with the control operation of this technique, a small change in mirror angle causes a sharp increase/decrease in the discharge current, and discharge is sometimes discontinued, which is a problem.

SUMMARY OF THE INVENTION

The present invention has been made in view of the above problems, and has as its main object to provide an ion laser apparatus and a mirror angle adjusting method therefor, with which the output variation width of a laser beam can be set within a predetermined range even when the characteristics of a constituent component such as a laser tube change over time.

In order to achieve the above object, according to the present invention, there is provided an ion laser apparatus comprising a laser tube, first and second mirrors disposed to sandwich the laser tube, a mirror angle adjusting mechanism for adjusting an angle of at least one of the mirrors while scanning the mirror within a predetermined angle width, and an alignment controller for determining a scan angle width of the mirror in accordance with a light intensity distribution of a laser beam such that a variation value of the laser beam output from the laser tube falls within a predetermined width.

BRIEF DESCRIPTION OF THE DRAWINGS

FIG. 2 is an enlarged view showing the structure of the mirror angle adjusting mechanism (when an electrostrictive element is used) of the ion laser apparatus;

DESCRIPTION OF THE PREFERRED EMBODIMENT

Figure 1:
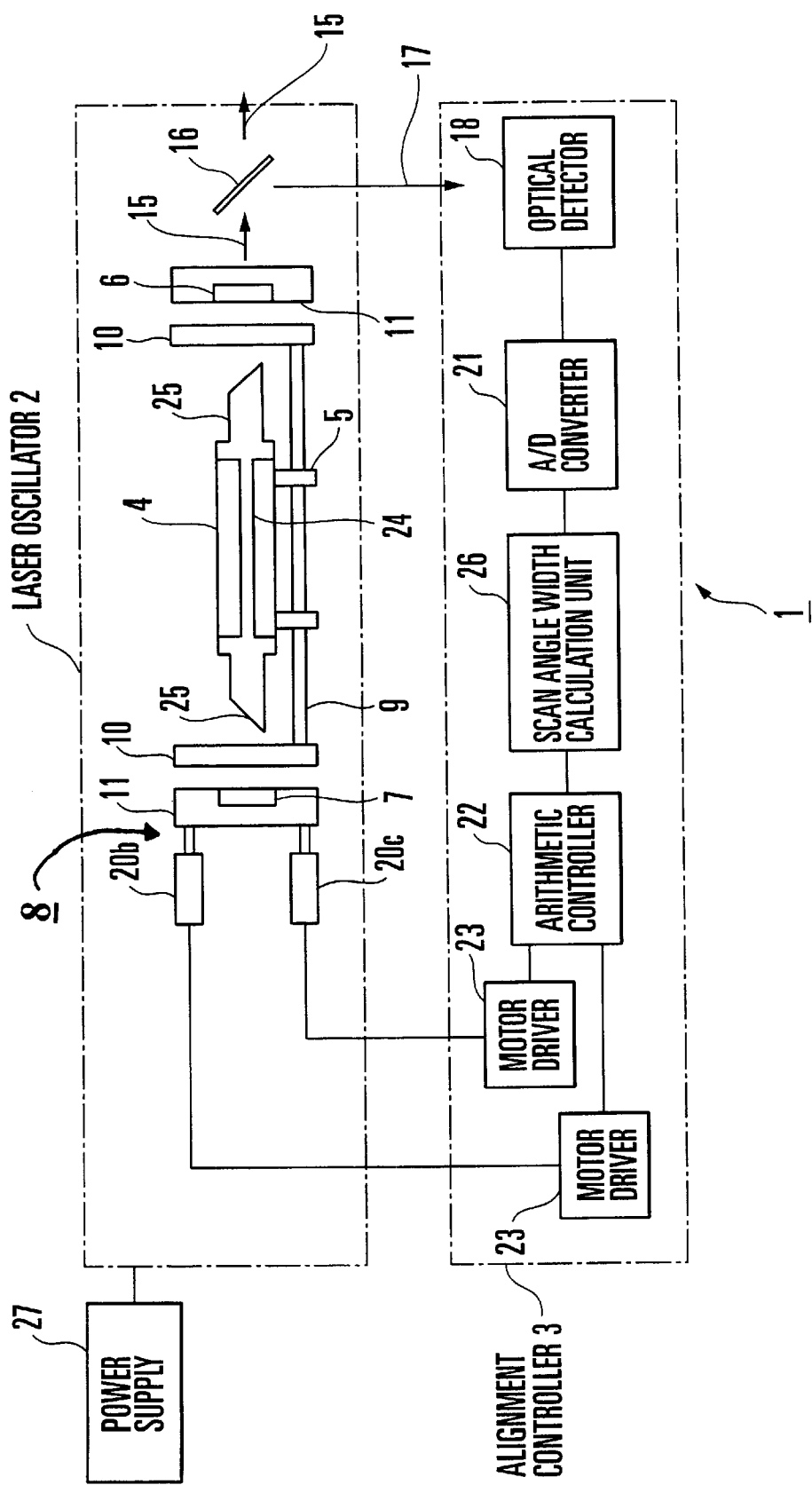
FIG. 1 is a diagram showing the overall arrangement of an ion laser apparatus according to the present invention.

An ion laser apparatus according to one preferred embodiment of the present invention is as follows. This ion laser apparatus has a laser tube (4 in FIG. 1), a pair of output mirror (6 in FIG. 1) and total-reflecting mirror (7 in FIG. 1), an optical detector (18 in FIG. 1), screw assemblies (114a, 114b, and 114c in FIG. 2B), stepping motors (20b and 20c in FIG. 1), and an arithmetic controller (22 in FIG. 1). The pair of output mirror 6 and total-reflecting mirror 7 are arranged through the laser tube 4 to form an optical resonator. The optical detector 18 detects a laser output. The screw assemblies 14a, 14b, and 14c tilt the mirrors in two different directions. The stepping motors 20b and 20c rotate the screws of the screw assemblies. The arithmetic controller 22 controls the rotational angles of the stepping motors 20b and 20c. In this ion laser apparatus, a scan angle width calculation unit (26 in FIG. 1) is provided to detect the characteristics of the laser output with respect to the tilt angle of the mirror and to repeatedly set the scan angle width of the mirror in accordance with the detected characteristics.

FIG. 1 shows the overall arrangement of the ion laser apparatus. As shown in FIG. 1, an ion laser apparatus 1 is comprised of a laser oscillator 2, alignment controller 3, and power supply 27. The laser oscillator 2 is comprised of a laser tube 4, a support 5 for supporting the laser tube 4, an output mirror 6, a total-reflecting mirror 7, and a mirror angle adjusting mechanism 8 for adjusting the mirror angles of the output mirror 6 and total-reflecting mirror 7. The alignment controller 3 is comprised of an optical detector 18, an A/D converter 21, a scan angle width calculation unit 26 as the characteristic feature of this embodiment, an arithmetic controller 22, and motor drivers 23. The optical detector 18 measures the intensity of a monitor beam 17. The A/D converter 21 performs A/D conversion. The scan angle width calculation unit 26 calculates and updates the can angle width. The arithmetic controller 22 controls the stepping motors 20b and 20c in accordance with the intensity of the monitor beam 17. The motor drivers 23 drive the stepping motors 20b and 20c.

The operation of the ion laser apparatus having the above arrangement will be briefly described. A laser beam 15 emitted by the laser tube 4 is reflected by the total-reflecting mirror 7 and transmitted through the output mirror 6. Part of the transmitted laser beam 15 is guided by a beam splitter 16 to the optical detector 18 as the monitor beam 17, while the remaining transmitted laser beam 15 is emitted to the outside as the laser beam 15. The optical detector 18 comprised of a solar cell, photodiode, and load circuit detects the optical intensity of the monitor beam 17. A signal obtained by the optical detector 18 is A/D-converted by the A/D converter 21. The scan angle width calculation unit 26 calculates and updates the scan angle width on the basis of the A/D-converted data. The scan angle width is then processed by the arithmetic controller 22, and drives the stepping motors 20 through the motor drivers 23 in order to correct the tilt of the total-reflecting mirror 7 or output mirror 6.

Figure 2A:
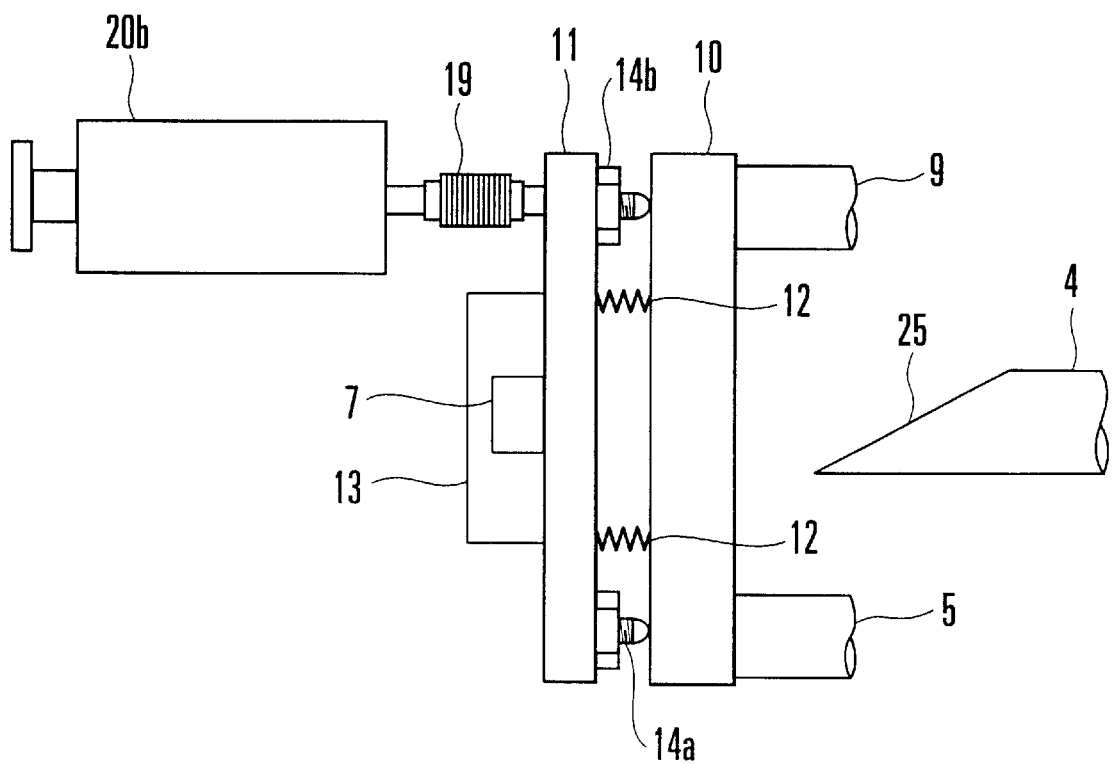
FIG. 2A is an enlarged view showing the structure of the mirror angle adjusting mechanism (when a stepping motor is used) of the ion laser apparatus.
Figure 2B:
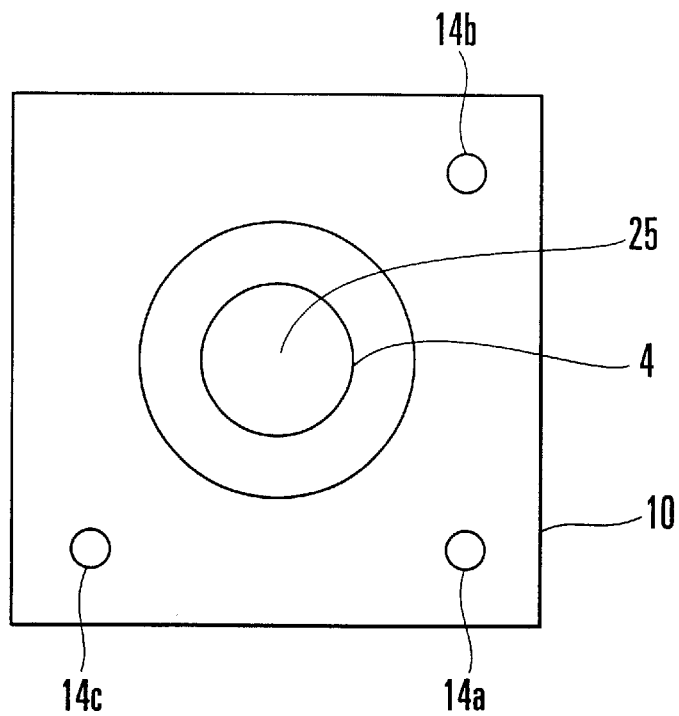
FIG. 2B is a front view showing a stationary plate.

FIG. 2A shows the mirror angle adjusting mechanism 8 of FIG. 1 in detail.

Figure 6:
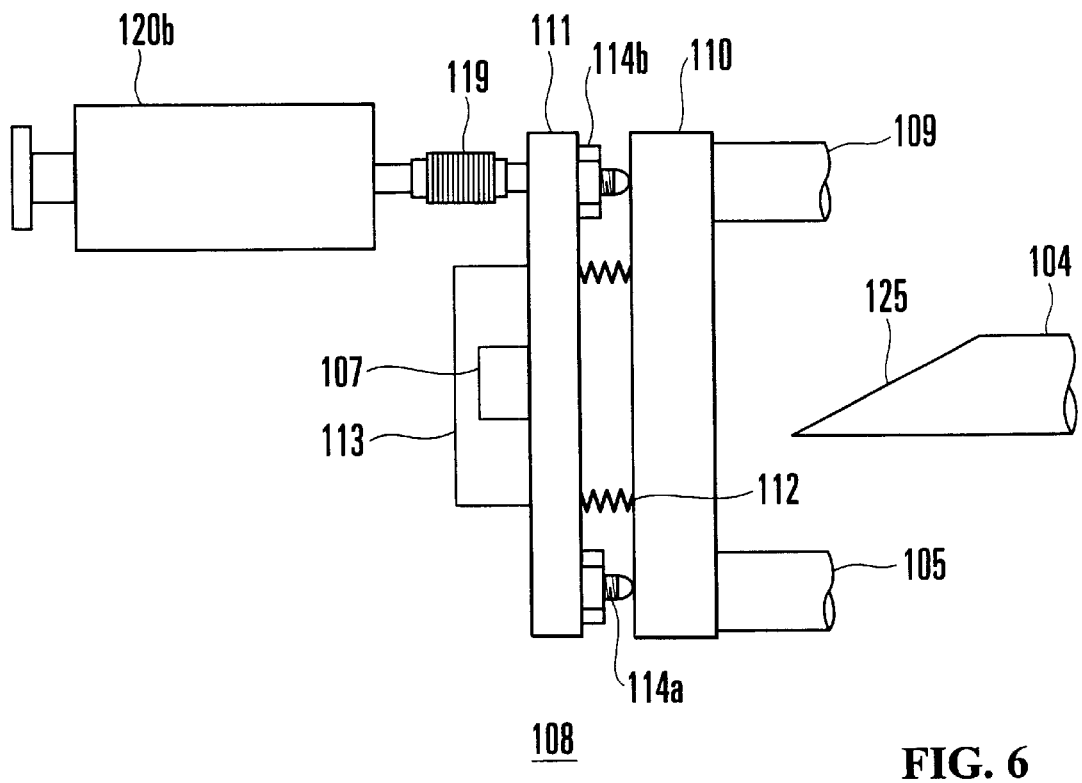
FIG. 6 is an enlarged view showing the structure of the mirror angle adjusting mechanism of the conventional ion laser apparatus.
Figure 7:
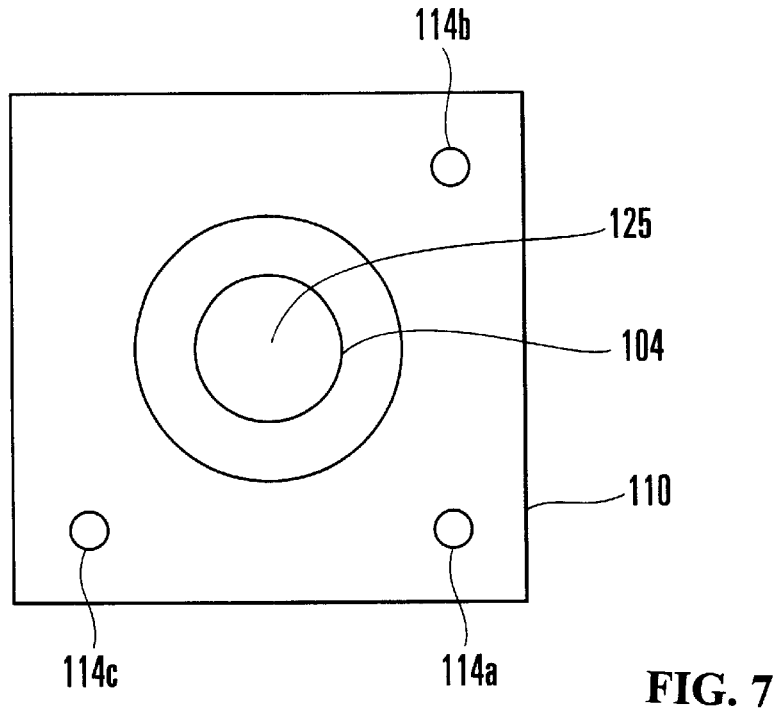
FIG. 7 is a front view showing a stationary plate.
Figure 8:
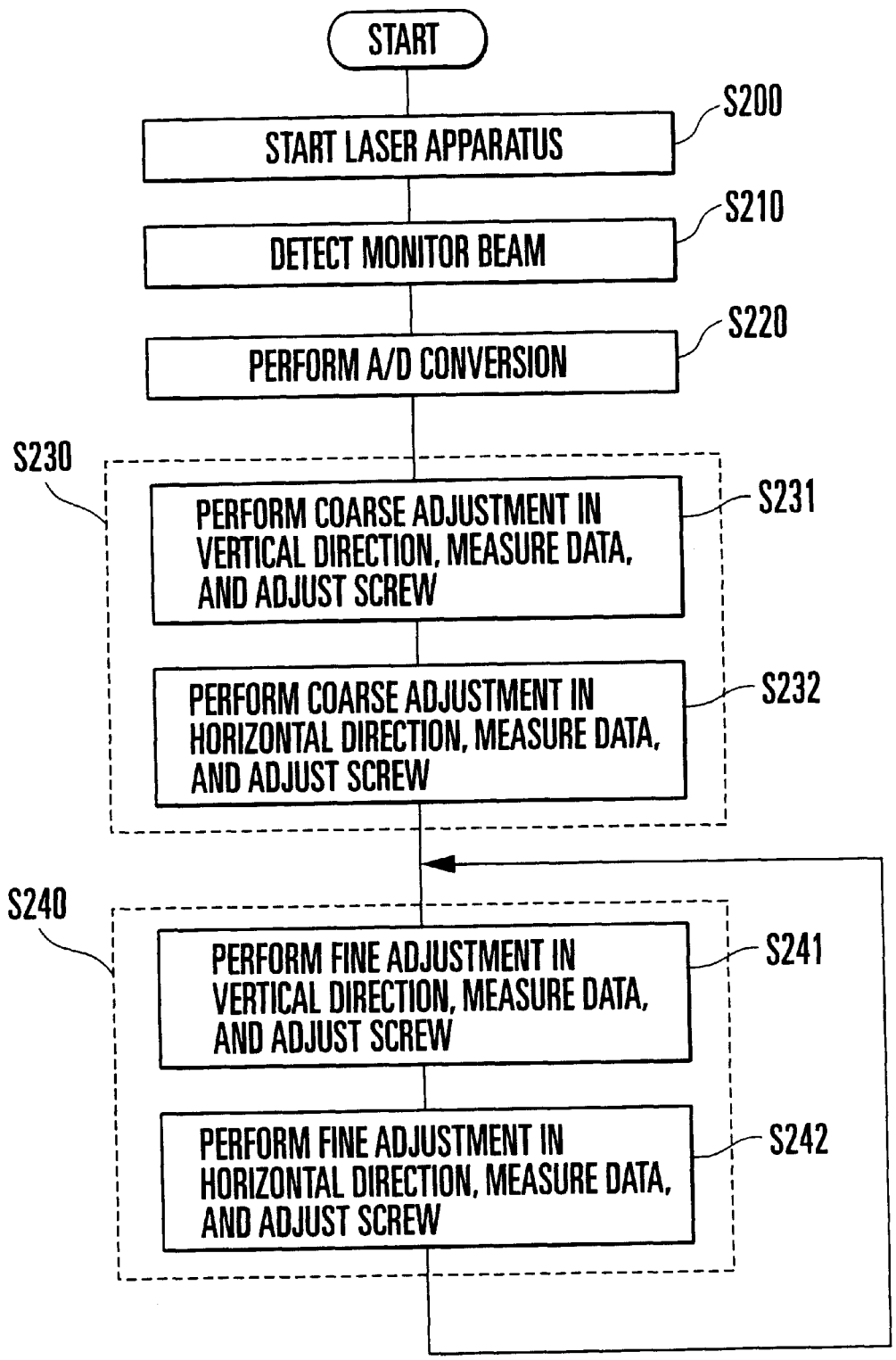
FIG. 8 is a flow chart showing a conventional mirror angle adjusting procedure.

Since FIGS. 6 and 7 show the parts of the mirror adjusting mechanism 8 of FIG. 1, they will be used wherever possible in the following description of the mirror adjusting mechanism 8.

The basic arrangement of the mirror angle adjusting mechanism 8 is common between the output mirror 6 side and the total-reflecting mirror 7 side, and a description will thus be made on the total-reflecting mirror 7 side. The support 105 where the laser tube 104 is fixed is constituted by an invar rod 109 which is a metal having a low coefficient of thermal expansion, to suppress thermal expansion in the direction of optical path of the laser beam 15. Stationary plates 110 are fixed to two ends of the invar rod 109, and movable plates 111 are arranged outside the stationary plates 110. The stationary plates 110 and movable plates 111 are arranged parallel to each other, and are connected to each other through tension springs 112. The output mirror 6 and total-reflecting mirror 107 are fixed to the movable plates 111, respectively, through mirror holders 113.

In each movable plate, screw holes are formed at three positions which form a shape L when viewed from the total-reflecting mirror 107 side (when seeing the right side from the left side in FIG. 7) to the exit direction of the laser beam 15, to be parallel to the optical axis. The adjustment screws 114a to 114c are screwed into the three screw holes respectively from the outside to extend through them. The distal ends of the three adjustment screws 114a to 114c project from the movable plate 111 toward the stationary plate 110 for a length equal to or more than the lengths of the tension springs 112, and the springs 112 serve as the tension springs. The gap between each stationary plate and the corresponding movable plate is determined by the projecting lengths of the adjustment screws 114a to 114c from the movable plate. The lengths of the projecting portions of the three adjustment screws 114a to 114c and the positions of the three adjustment screws 114a to 114c which are determined by design determine the tilt of the mirror.

After the gap between the stationary plate 110 and the corresponding movable plate 111 is determined, of the adjustment screws 114a to 114c arranged to form a shape L, the adjustment screw 114a located at the pivotal point is fixed as it need not be rotated any longer. The adjustment screw 114a serves as the fulcrum for the two other adjustment screws 114b and 114c located at the two distal ends of the shape L. When the adjustment screws 114a to 114c are rotated clockwise, the projecting lengths of their distal ends increase, so that the gap between the stationary plate 110 and movable plate 111 increases. Inversely, when the adjustment screws 114a to 114c are rotated counterclockwise, the projecting lengths of their distal ends decrease, so that the gap between the stationary plate 110 and movable plate 111 decreases.

When the adjustment screw 114b at the upper end of the shape L is rotated, the gap between the stationary plate 110 and movable plate 111 at the upper portion changes about the adjustment screw 114a as the fulcrum, so the tilt of the mirror can be changed in the vertical direction. Similarly, when the adjustment screw 114c at the lower end of the shape L is rotated, the gap between the stationary plate 110 and movable plate 111 changes about the adjustment screw 114a as the fulcrum, so the tilt of the mirror can be changed in the horizontal direction. The tilt of the mirror can be adjusted to an arbitrary value by the two adjustment screws 114b and 114c. Usually, mirror angle adjustment is performed by rotating the adjustment screws 114b and 114c while measuring the laser output, so that the laser output is adjusted to the maximum value.

The adjustment screws 114b and 114c are driven by the stepping motors 120b and 20c. The shaft of the stepping motor 120b is connected to the adjustment screw 114b on the outer side through a coupling component 119. As the motor used in this case, a stepping motor advantageous for quick start, rotation, and stopping, and high-precision positioning is selected. Calculation is performed by the arithmetic controller 22 on the basis of the output signal of the monitor beam 17. As a result, an operation signal indicating the rotational direction and angle of the shaft is output from the arithmetic controller 22 to the motor drivers 23. The motor drivers 23 output necessary pulse counts to the stepping motors 120b and 20c, thereby rotating the stepping motors 120b and 20c. Within the output range of the laser to be used, this electrical signal must keep linearity with respect to the output value of the laser beam.

Figure 3:
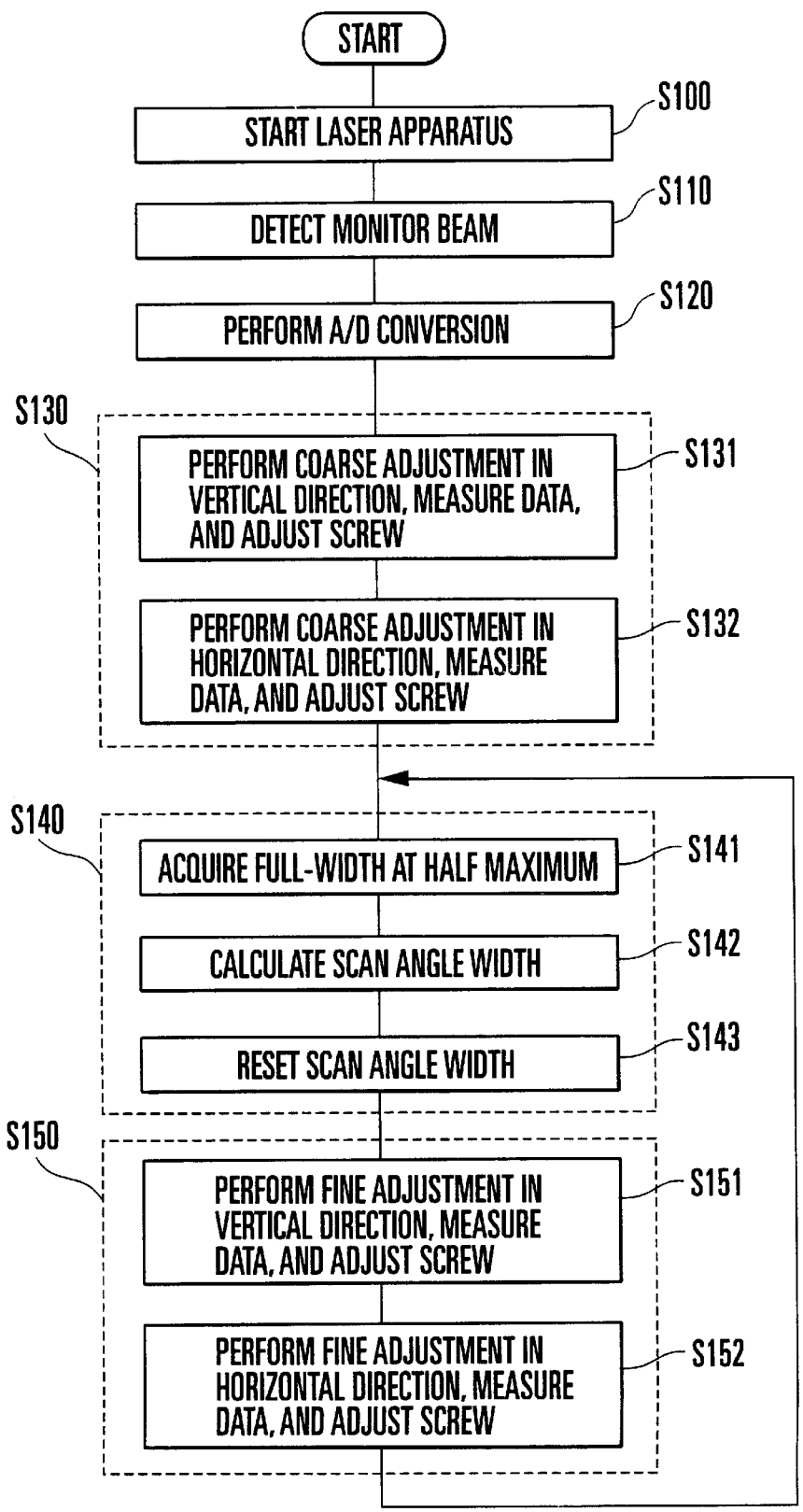
FIG. 3 is a flow chart showing a mirror angle adjusting procedure according to an embodiment of the present invention.

FIG. 2 shows the structure of the mirror angle adjusting mechanism of FIG. 1 in detail using element number identical to FIG. 6 wherever possible, and indicates a case wherein electrostrictive elements are used in place of the stepping motors. As shown in FIG. 3, the same effect as that described above can be obtained if electrostrictive elements such as piezoelectric elements are used in place of the stepping motors. A composite structure in which coarse adjustment is performed by stepping motors and fine adjustment is performed by piezoelectric elements is also possible. Although not shown, the adjustment screw 114a located at the pivotal point may also be connected to a stepping motor or an electrostrictive element.

FIG. 3 explains a mirror angle adjusting method of this embodiment. In the following description, for the sake of descriptive convenience, left and right sides correspond to those obtained when viewed from the reflection side to the exit direction. When performing positioning, the motor is always rotated from a predetermined rotational direction and is stopped so that a backlash is obtained. This motion does not directly concern the present invention, and a description on the backlash operation will accordingly be omitted. The stepping motors 20b and 20c, and the adjustment screws 114b and 114c may form reduction gear structures by means of gears. In this embodiment, however, a case wherein the reduction ratio is 1:1 will be described, in the same manner as in the conventional example. The tilt angle of the mirror with respect to the rotational angle of the adjustment screw is determined by the screw pitches of the adjustment screws 114b and 114c and the distance between the adjustment screws 114b and 114a, and that between the adjustment screws 114c and 114a. Note that a rotational angle of 1° of the adjustment screw corresponds to a change of 0.01° of the tilt angle of the mirror, in the same manner as in the conventional example.

Figure 9:
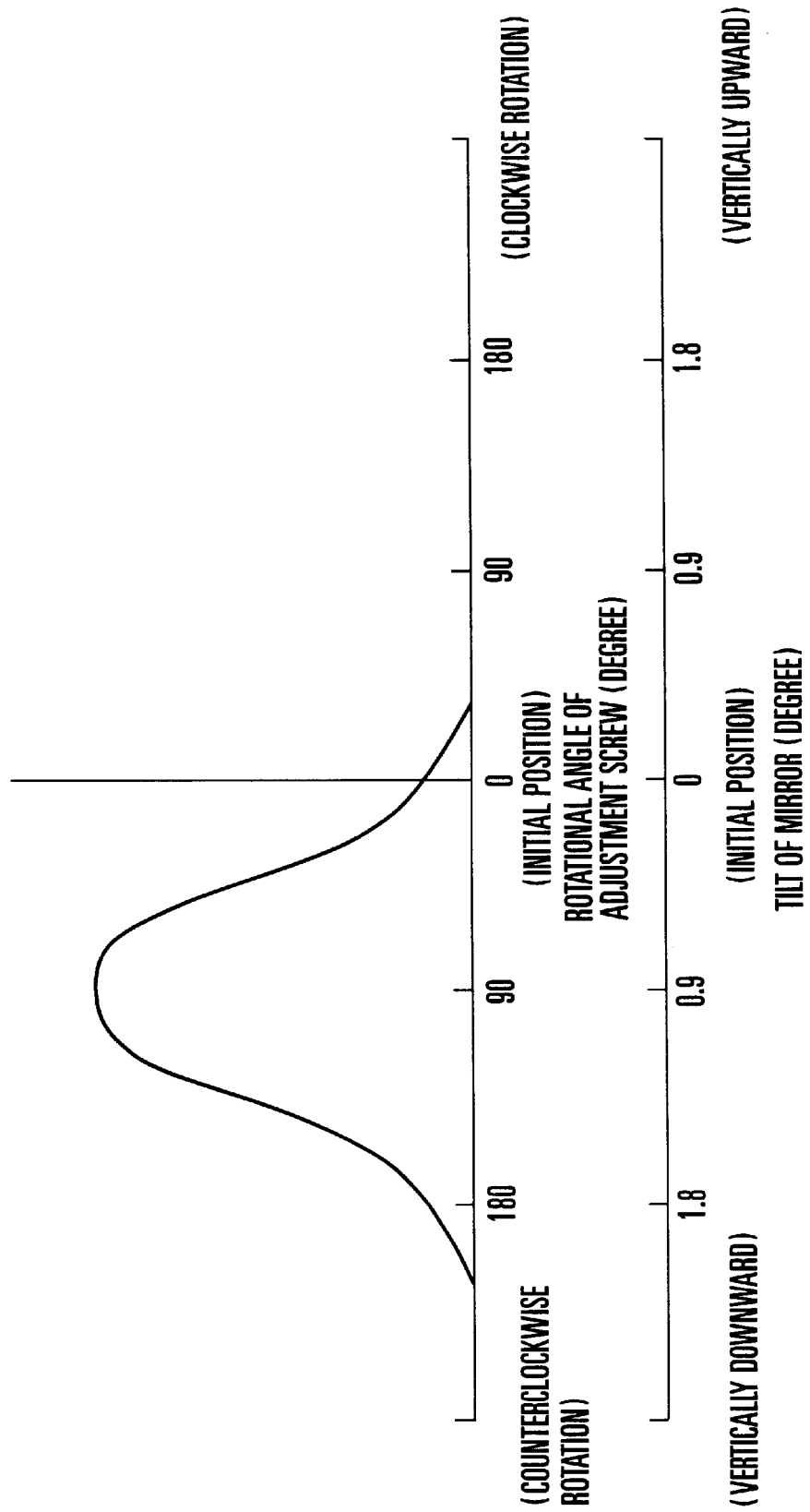
FIG. 9 is a graph of alignment sensitivity characteristics showing a scan angle width and an output variation width.

The ion laser apparatus 1 is started by a constant-current operation obtained by controlling a discharge current to a constant value (S100), and after that, of the laser beam 15, the monitor beam 17 reflected by the beam splitter 16 is detected by the optical detector 18 (S110). The detected data is A/D-converted (S120), and the flow enters the coarse adjustment operation mode, which is the first step of automatic mirror adjustment. In the coarse adjustment operation mode (S130), first, coarse adjustment in the vertical direction is performed (S131). The vertical-direction adjustment screw 114b is rotated, and its output data is acquired. For example, the vertical-direction stepping motor 20b is rotated counterclockwise through a ½ turn to rotate the adjustment screw 114b counterclockwise through a ½ turn. From this position, the stepping motor 20b is rotated clockwise through a ½ turn, while measuring the output data of the laser beam in units of specified angles (the angle is specified by variably changing the pulse count). In this embodiment, an angle of 3° is defined as one step (unit). When 60 data corresponding to a ½ turn are measured, the stepping motor 20b returns to the initial position. With the above steps, measurement of the output data corresponding to counterclockwise rotation through a ½ turn from the initial position is completed. The stepping motor 20b is further rotated clockwise through a ½ turn while measuring the output data. Hence, measurement of data on the ½ turn from the initial position in each of the clockwise and counterclockwise directions or a total of 1 turn, i.e., 120 output data, is completed. This corresponds to 3.6° in mirror angle. A measurement example of this output data is the same as that shown in FIG. 9.

Figure 10:
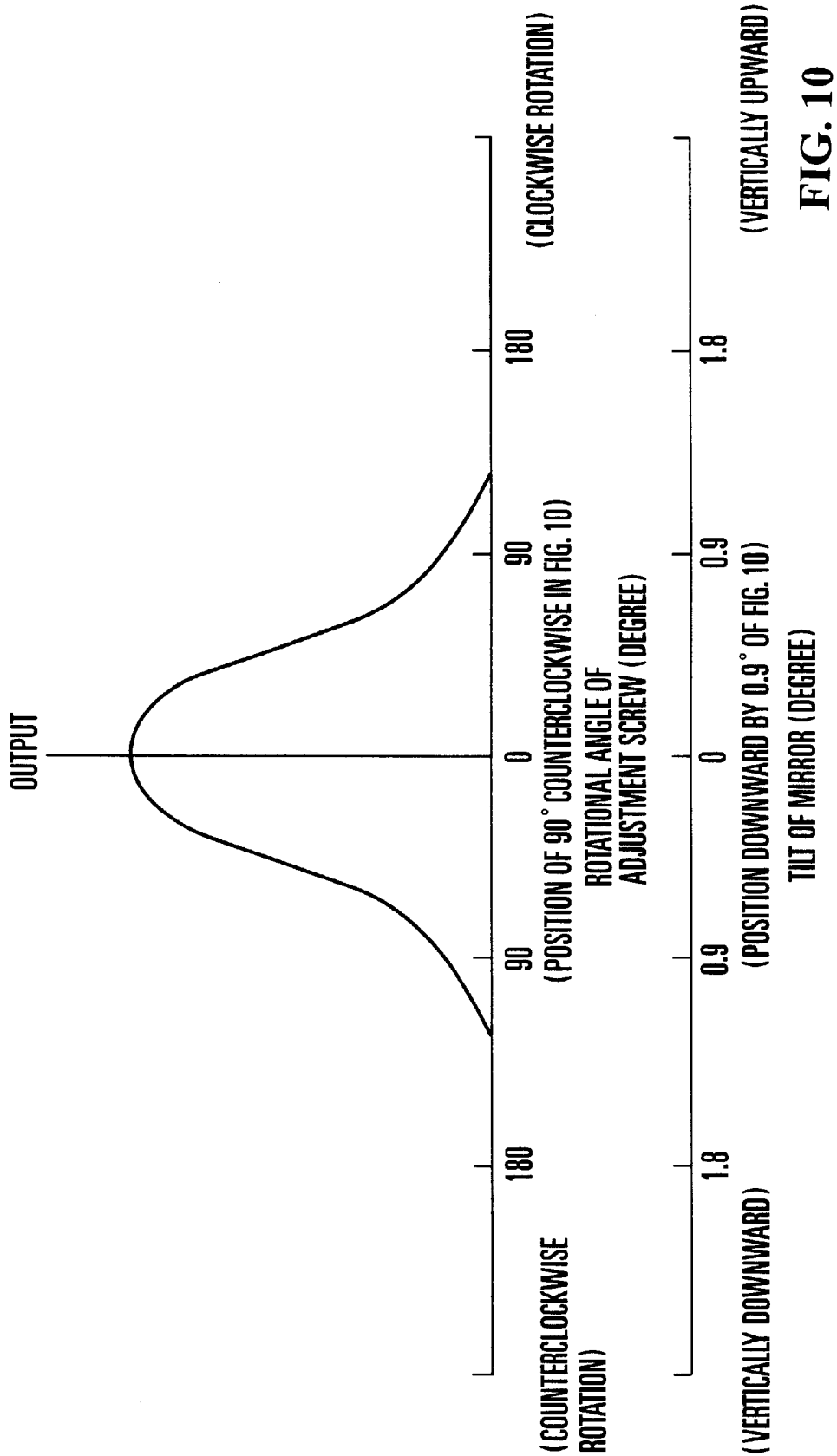
FIG. 10 is a graph of alignment sensitivity characteristics obtained after measurement of vertical-direction coarse adjustment is performed.
Figure 11:
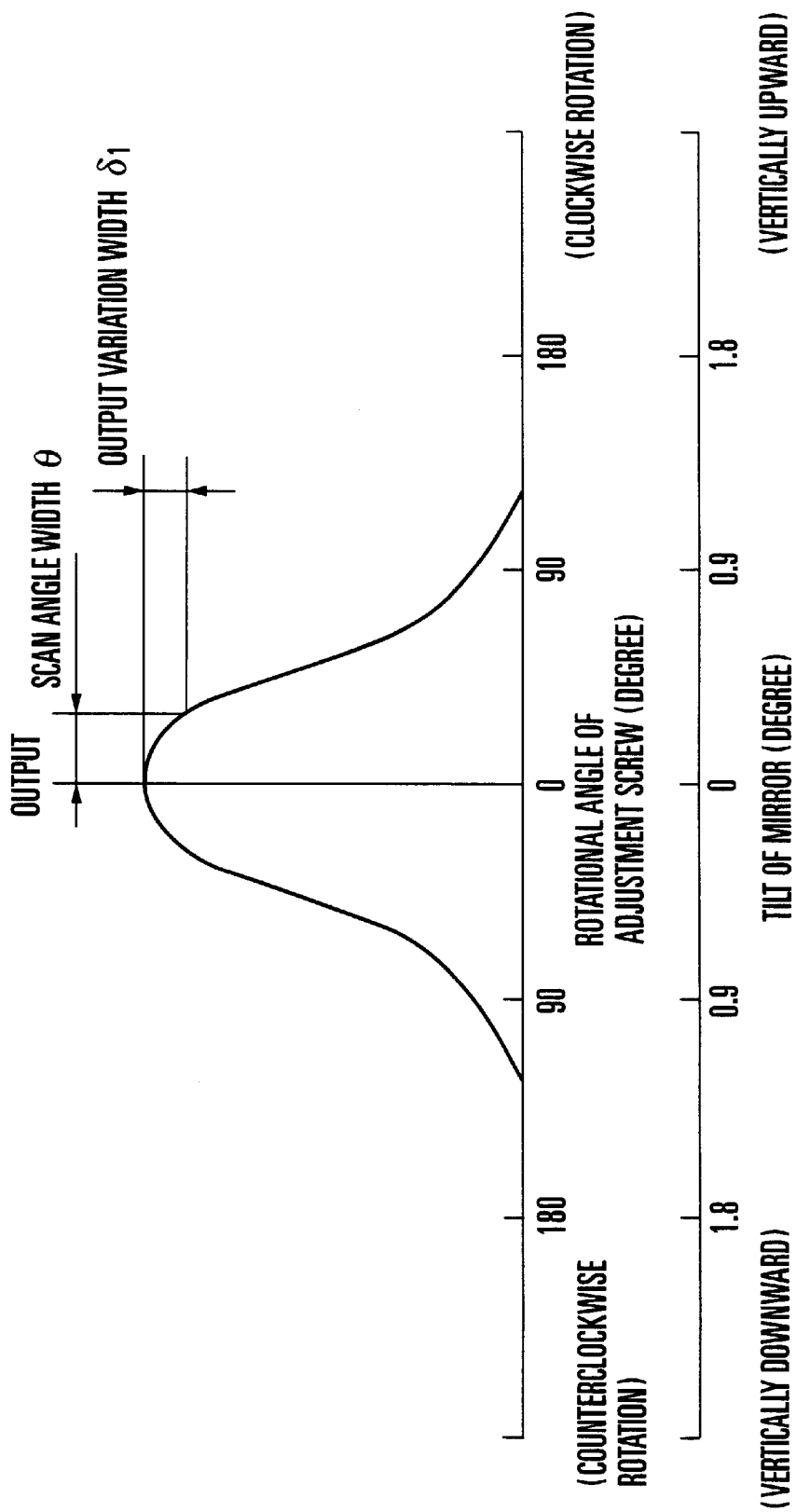
FIG. 11 is a graph of alignment sensitivity characteristics showing a conventional scan angle width and output variation width.
Figure 12:
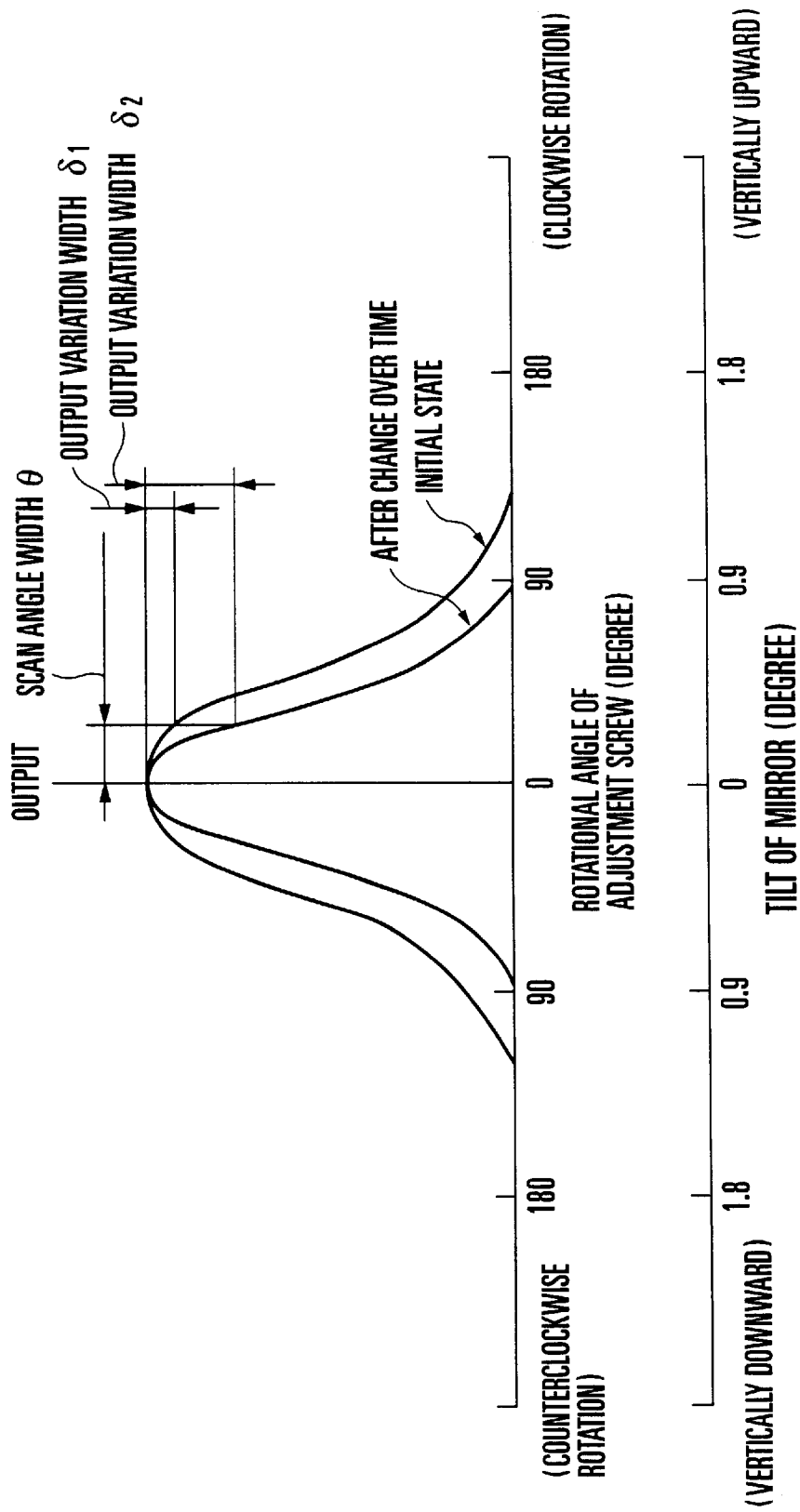
FIG. 12 is a graph of alignment sensitivity characteristics showing the conventional scan angle width and output variation width.
Figure 13:
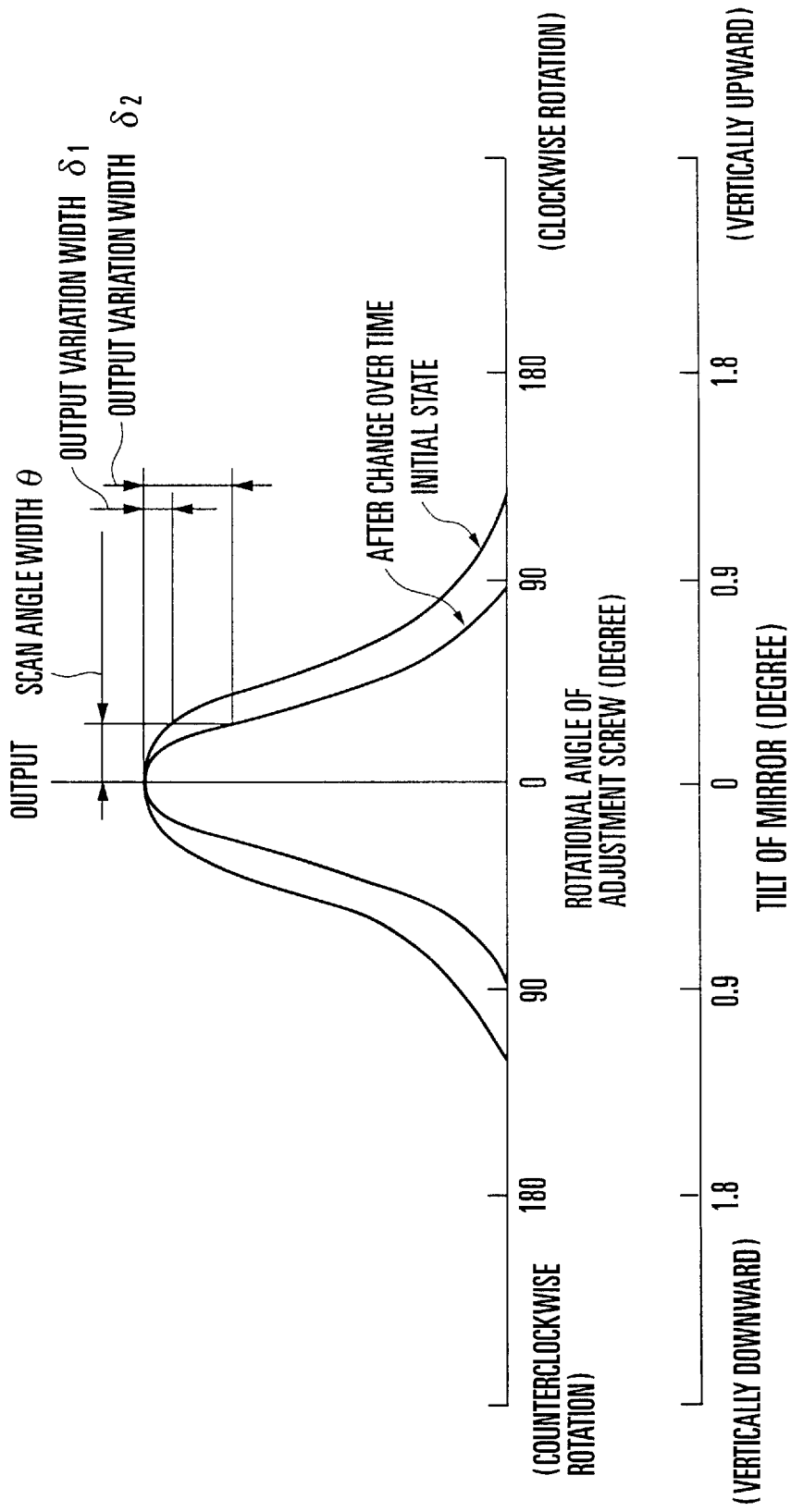
FIG. 13 is a graph of alignment sensitivity characteristics showing the conventional scan angle width and output variation width.

The adjustment screws are then adjusted. More specifically, when output measurement of the ½ turn from the initial position in each of the clockwise and counterclockwise directions is completed, the stepping motor 20b is so rotated as to return to the maximum angle within the measured data, and is stopped. In this embodiment, the stepping motor 20b is rotated counterclockwise through 90°, and then stopped. Coarse adjustment in the vertical direction is thus completed. In this state, a position reached after rotation through 90° from the initial position serves as the reference position in the next step. Therefore, data is shifted as shown in FIG. 10, so that the peak falls at the center. Subsequently, coarse adjustment in the horizontal direction (S132) is performed by rotating the horizontal-direction stepping motor 20c, in the same manner as in step S131. With this measurement, when the mirror angle has an error in the horizontal direction, the peak position can be confirmed in the same manner as in the vertical direction. The stepping motor 20c is rotated, on the basis of the measured data, through an optimum mirror angle with which the maximum output can be obtained, thereby adjusting the adjustment screws.

The coarse adjustment mode is thus completed. The alignment sensitivity characteristics change from time to time to cope with a temperature rise in the oscillator or a change in the ambient temperature that occurs after the coarse adjustment mode.

Figure 4:
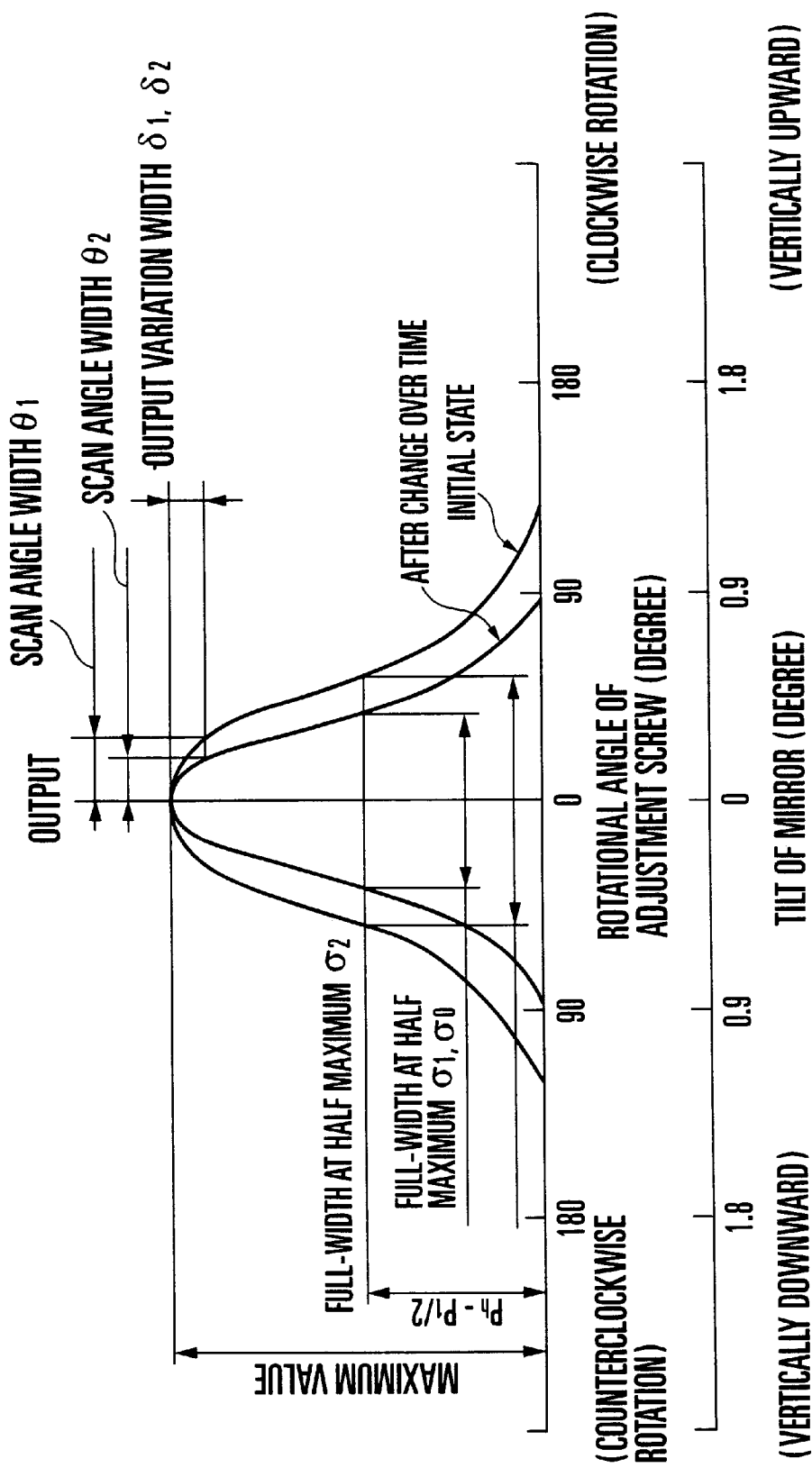
FIG. 4 is a graph showing the alignment sensitivity characteristics obtained when vertical-direction coarse adjustment is completed.

FIG. 4 shows the alignment sensitivity characteristics in two types of operation times (initial state and after a change over time). The outer curve indicates an example of alignment sensitivity obtained when the operation time is on the order of several hours (initial state), and the inner curve indicates an example of alignment sensitivity obtained when the operation time is on the order of several thousand hours (after a change over time). The latter curve has a sharper shape.

In the conventional case, mirror fine adjustment is performed with the predetermined scan angle width θ without considering the alignment sensitivity characteristics that change from time to time. In contrast to this, according to the characteristic feature of this embodiment, before entering the fine adjustment mode, the scan angle width is calculated in accordance with the alignment sensitivity characteristics (S140). This method will be described hereinafter.

Figure 5:
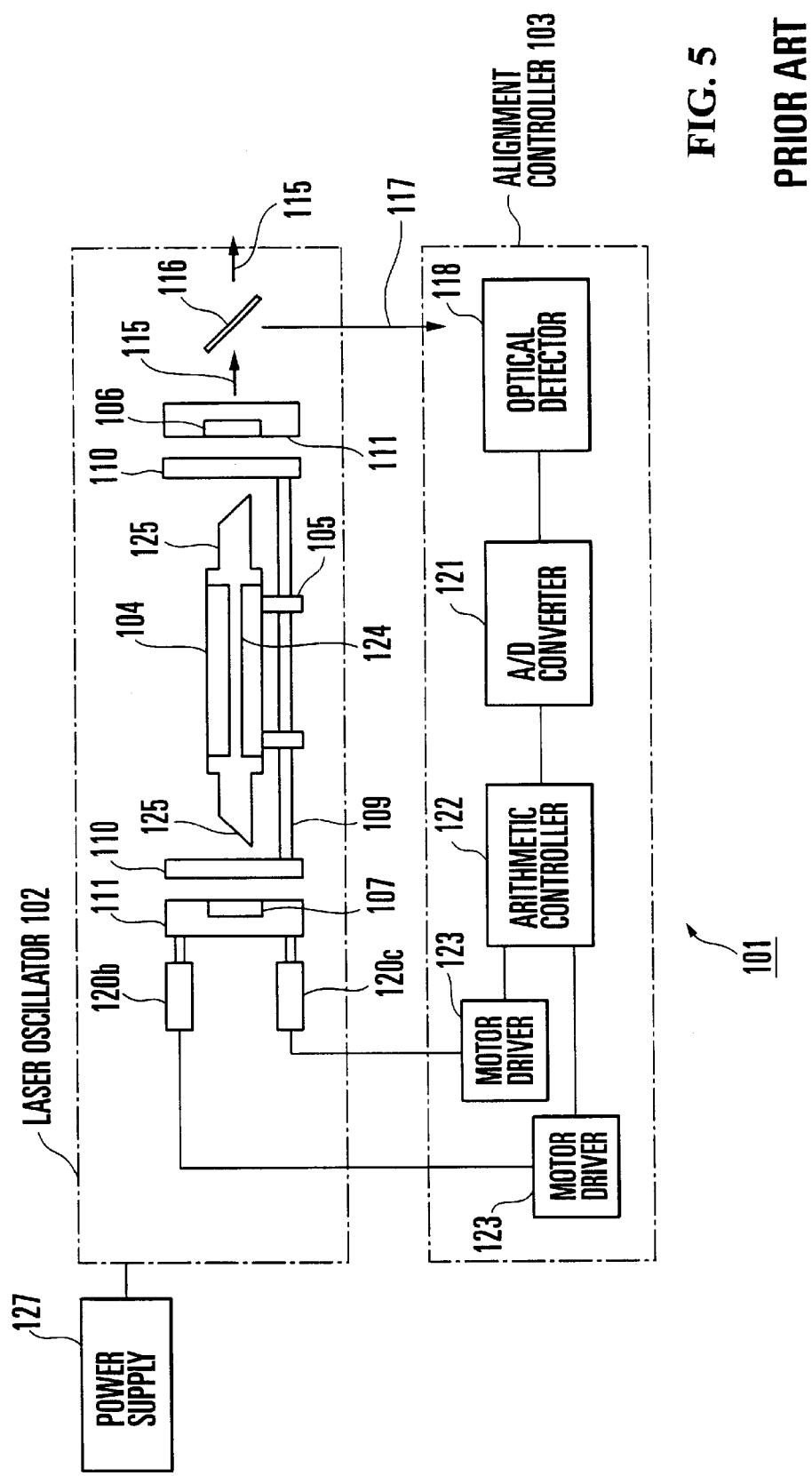
FIG. 5 is a diagram showing the overall arrangement of a conventional ion laser apparatus.

In step S141, the width of the alignment sensitivity characteristics is calculated. More specifically, the width of the spread of the curve is calculated from data on the alignment sensitivity obtained by coarse adjustment performed beforehand. In this embodiment, the full-width at half maximum of these characteristics will be calculated as a value representing the width of the span. This value is not limited to the full-width at half maximum, but no problem arises if a value such as $^1\!/_{10}$ the maximum value is used. For the later calculation, as the full-width at half maximum, $\sigma_0$ is set as a fixed value from the initial characteristics. Subsequently, as shown in FIG. 5, the maximum output obtained in the coarse adjustment process is defined as $P_1$, and the rotational angle of the adjustment screw with which $P_1$ is obtained is defined as 0°. Since the full-width at half maximum is the width obtained between points corresponding to ½ the maximum value, a value $P_h$ which is half the maximum output is calculated as:

$$P_h = P_1/2 \qquad (1)$$

Then, while comparing the magnitudes of the respective output data on the alignment sensitivity and $P_h$, points (the angles of the adjustment screws) before and after a point where the magnitudes are inverted are obtained. Concerning the two points before and after the point where the magnitudes are inverted, assume that between these two points, the value changes linearly, and an angle corresponding to $P_h$ is calculated from a ratio. To calculate the angle at the point $P_h$, a simple method may be employed, for example, a larger one of angles after magnitude inversion may always be determined as the angle corresponding to $P_h$. The width of the angle obtained in this case is defined as $\sigma_0$, the full-width at half maximum of the alignment sensitivity with the operation time of several ten hours is defined as $\sigma_1$, and the full-width at half maximum of the alignment sensitivity with the operation time of several thousand hours is defined as $\sigma_2$. From the sharpness of the alignment sensitivity, $\sigma_2 < \sigma_1$ is established.

In step S142, the scan angle width is calculated. assuming that the scan angle width representing the angle width (=the width of the angle through which the stepping motor is rotated) through which the mirror is oscillated in the fine adjustment stage is θ, the scan angle width determined by the initial characteristics is set as a fixed value $\theta_0$. Scan angle widths $\theta_1$ and $\theta_2$ of the respective operation times are calculated from the initial full-width at half maximum $\sigma_0$ and the full-widths at half maximum $\sigma_1$ and $\sigma_2$ of the respective operation times by proportional calculation:

scan angle width $\theta_1$ after lapse of several ten hours: $\theta_1 = \theta_0 \times \sigma_1/\sigma_0$ (2)

scan angle width $\theta_2$ after lapse of several thousand hours: $\theta_2 = \theta_0 \times \sigma_2/\sigma_0$ (3)

Calculation, reset, and resetting calculation of these scan angle widths (S143) are performed automatically during coarse adjustment each time the operation is started. With the characteristics obtained after the lapse of several ten hours where the operation time does not substantially elapsed yet, the change amount in alignment sensitivity is small. Accordingly, the scan angle widths satisfy $\theta_1 \approx \theta_0$. An output variation width $\delta_1$ is small.

Since the scan angle width $\theta_2$ calculated from the alignment characteristics obtained after the lapse of several thousand hours is set small to match the sharp alignment sensitivity, an output variation width $\delta_2$ does not become larger than $\delta_1$, unlike in the conventional example. In this manner, an output variation width $\delta$ is not increased or decreased over time by the scan angle width $\theta$ updated upon each use.

After that, fine adjustment operation (S150) identical to that in the conventional case is performed with $\theta$ which is to be updated. The fine adjustment mode is performed by rotating the motor clockwise and counterclockwise from this position until reaching a position where the maximum output within the width of this rotation is obtained, in the same manner as the coarse adjustment mode. If the rotational angle is large, the output varies largely. For this reason, the rotational angle is set smaller than that in the coarse adjustment. The fine adjustment mode is different from the coarse adjustment mode in this respect. Assume that updated $\theta$ is expressed as $\theta_2$. In fine adjustment in the vertical direction, first, the vertical-direction stepping motor 20b is rotated counterclockwise through $\theta_2°$ in order to rotate the adjustment screw 14b counterclockwise through $\theta_2°$. After that, the stepping motor 20b is rotated clockwise through $\theta_2°$ while measuring output data on the laser beam in units of specified angle (specified by variably changing the pulse count). In this embodiment, when $\theta$ data corresponding to $\theta_2°$ are measured with reference to 1° as one step (unit), the motor is returned to the initial position.

Hence, measurement of output data corresponding to $\theta_2°$ in the counterclockwise direction is completed. Furthermore, the motor is consecutively rotated clockwise through $\theta_2°$ while measuring the output data. Hence, measurement of $2\theta$ output data corresponding to $\theta_2°$ in each of the clockwise and counterclockwise directions, i.e., a total of $2\theta_2°$, is completed (S131).

Subsequently, the motor is rotated from the initial position through an angle corresponding to the maximum value of the measurement data of $\theta_2°$ in both the clockwise and counterclockwise directions, and is stopped, to adjust the adjustment screw. Thus, one cycle of vertical-direction fine adjustment is ended. When the adjustment screw is moved in step S151, the laser output varies accordingly. The magnitude of variations changes within the output variation width $\delta_2$, as indicated by the output characteristics with respect to the mirror angle shown in FIG. 4. Then, horizontal-direction fine adjustment in step S152 is performed by moving the horizontal-direction stepping motor 20c in the same manner as in step S151. The horizontal-direction motor 20c is rotated through an angle corresponding to the maximum value of the measurement data, to adjust the corresponding adjustment screw. Thus, one cycle of horizontal-direction fine adjustment is ended. After this, fine adjustment in step S150 is repeated while the ion laser apparatus operates.

In this manner, according to this embodiment, calculation and resetting of the scan angle width on the basis of the alignment sensitivity are always performed so that an optimum alignment state required for obtaining the maximum output at the time point in question is obtained. Therefore, an error in mirror angle caused by a temperature change can always be corrected, and the output of the laser beam can be maintained at substantially the maximum value with only the small output variation width $\delta_1$.

In this embodiment, the rotational angles and steps employ simple numbers to facilitate the description. Depending on the stepping motors, the reduction gears of the gears, and the components of the mechanism, the precision can be improved by defining 1 step on the order of 1/100°.

In this embodiment, the mirror angle adjusting mechanism 8 is provided on the total-reflecting mirror 7 side, but it may be provided to the output mirror 6 side. Alternatively, mirror angle adjusting mechanisms 8 may be provided to the both sides to perform adjustment alternately.

As has been described above, according to the present invention, in automatic of mirror angle adjustment for an ion laser apparatus, variations in laser beam output over time can be suppressed. This is due to the following reason. With the arrangement of the present invention, each time coarse adjustment is performed, the scan angle width is automatically calculated and updated, and fine adjustment is performed by using the obtained value. An error in mirror angle caused by a temperature change can thus always be corrected, and the output of the laser beam can be maintained at substantially the maximum value.

What is claimed is:

1. An ion laser apparatus comprising:
    a laser tube;
    first and second mirrors disposed to sandwich said laser tube;
    a mirror angle adjusting mechanism for adjusting an angle of at least one of said mirrors while scanning said mirror within a predetermined angle width; and
    an alignment controller for determining a scan angle width of said mirror in accordance with a light intensity distribution of a laser beam such that a variation value of the laser beam output from said laser tube falls within a predetermined width.

2. An apparatus according to claim 1, wherein said alignment controller has an optical detector for monitoring the laser beam, a scan angle width calculation unit for calculating the scan angle width of said mirror on the basis of data acquired by said optical detector, and an arithmetic controller for controlling the angle of said mirror in accordance with a calculation result of said scan angle width calculation unit.

3. An apparatus according to claim 1, wherein said mirror angle adjusting mechanism has a screw assembly having a screw which abuts against a stationary plate mounted on an ion laser apparatus main body and which is screwed into a movable plate where said mirror is set, and a stepping motor for pivoting said screw.

4. An apparatus according to claim 1, wherein said mirror angle adjusting mechanism has a screw assembly having a screw which abuts against a stationary plate mounted on an ion laser apparatus main body and which is screwed into a movable plate where said mirror is set, and an electrostrictive element for pivoting said screw.

5. An apparatus according to claim 4, wherein said electrostrictive element is a piezoelectric element.

6. An apparatus according to claim 1, wherein said first and second mirrors constitute an optical resonator.

7. An apparatus according to claim 1, wherein said first mirror is an output mirror for reflecting part of the received laser beam and transmitting the remaining laser beam therethrough, and
    said second mirror is a total-reflecting mirror for totally reflecting the received laser beam.

8. A mirror angle adjusting method for an ion laser apparatus comprising a laser tube, first and second mirrors disposed to sandwich said laser tube, a mirror angle adjusting mechanism for adjusting an angle of at least one of said mirrors while scanning said mirror within a predetermined angle width, and an alignment controller for determining a scan angle width of said mirror in accordance with a light intensity distribution of a laser beam such that a variation value of the laser beam output from said laser tube falls within a predetermined width, comprising the step of:

calculating the scan angle width of said mirror with which an output value of the laser beam falls within the predetermined width;

scanning said mirror on the basis of a calculation result; and setting the angle of said mirror such that the output value of the laser beam becomes the maximum.

9. A method according to claim 8, wherein said alignment controller has an optical detector for monitoring the laser beam, a scan angle width calculation unit for calculating the scan angle width of said mirror on the basis of data acquired by said optical detector, and an arithmetic controller for controlling the angle of said mirror in accordance with a calculation result of said scan angle width calculation unit.

10. A method according to claim 8, wherein said mirror angle adjusting mechanism has a screw assembly having a screw which abuts against a stationary plate mounted on an ion laser apparatus main body and which is screwed into a movable plate where said mirror is set, and a stepping motor for pivoting said screw.

11. A method according to claim 8, wherein said mirror angle adjusting mechanism has a screw assembly having a screw which abuts against a stationary plate mounted on an ion laser apparatus main body and which is screwed into a movable plate where said mirror is set, and an electrostrictive element for pivoting said screw.

12. A method according to claim 8, wherein said electrostrictive element is a piezoelectric element.

13. A method according to claim 8, wherein said first and second mirrors constitute an optical resonator.

14. A method according to claim 8, wherein said first mirror is an output mirror for reflecting part of the received laser beam and transmitting the remaining laser beam therethrough, and said second mirror is a total-reflecting mirror for totally reflecting the received laser beam.

15. A method according to claim 8, having a coarse adjustment mode of checking an intensity of the laser beam by rotating said mirror within a width having an angle larger than an angle through which laser oscillation is performed, a mode of calculating the scan angle width on the basis of alignment sensitivity characteristics obtained in the coarse adjustment mode, and a fine adjustment mode of checking the intensity of the laser beam within only the scan angle width about the maximum output obtained in the coarse adjustment mode as the center.

* * * * *